Jan. 18, 1949. H. W. LUETKEMEYER ET AL 2,459,172
BEARING
Filed May 31, 1947
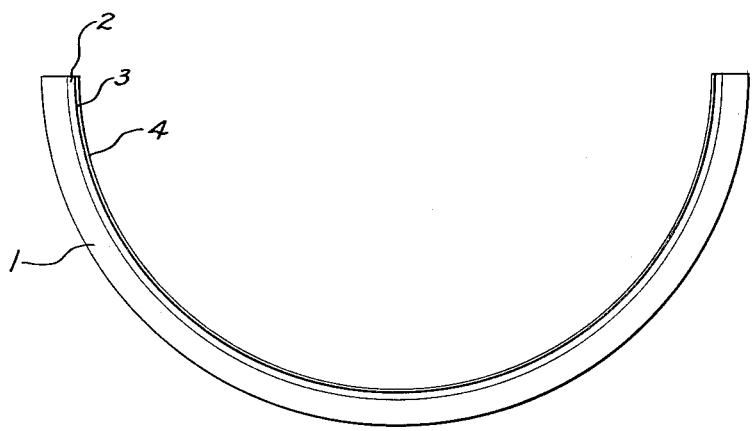
INVENTORS.
HENRY W. LUETKEMEYER
RALPH A. SCHAEFER
BY
*Fay, Golrick & Fay*
ATTORNEYS Patented Jan. 18, 1949

2,459,172

UNITED STATES PATENT OFFICE 2,459,172

BEARING

Henry W. Luetkemeyer, Euclid, and Ralph A. Schaefer, Cleveland, Ohio, assignors to The Cleveland Graphite Bronze Company, Cleveland, Ohio, a corporation of Ohio Application May 31, 1947, Serial No. 751,574

9 Claims. (Cl. 308—237)

The present invention, relating as indicated to bearings, is more particularly directed to an improved high duty bearing for use in such service as journalling crankshafts and the connecting rods of internal combustion engines. The principal object of the invention is the provision of such a bearing with very considerably increased fatigue and corrosion resistance over bearings of the type now in use.

A bearing now in common use and reasonably satisfactory for heavy duty applications is described in United States Letters Patent No. 2,316,119. It consists of a steel back, an intermediate layer of a non-ferrous high heat conducting metal with a medium modulus of elasticity, this intermediate layer being usually of copper, silver or their alloys, and a thin surface layer of bearing material, usually metal of preferably from .001 to .002 inch thick, which is commonly known as an overlay. This type of bearing has been very successful except when very highly loaded when it sometimes fails in fatigue.

For both economical and metallurgical reasons the most common intermediate layers employed for bearings of the above type have been copper-lead alloys, usually with high tin base alloys as overlays. In order to improve the fatigue resistance of the overlay, lead base alloys were substituted for tin base alloys as they possess higher fatigue strength, but this had the disadvantage that lead is quite susceptible to corrosion in hot lubricating oils and it was therefore necessary to alloy the lead with a minimum of 5% tin which made the lead alloys corrosion resistant. After a certain period of service the lead-tin overlays corrode because of the diffusion of tin from the overlay into the copper and lead of the intermediate layer at operating temperatures. This diffusion has been a source of trouble for a considerable period in this type of bearing which is otherwise a very satisfactory one and one which is widely used. We have found a means of minimizing this diffusion and producing a very much superior bearing with very much longer life under difficult operating conditions in the present invention. It has been found necessary to control the diffusion of the tin in such a way that the running surface will always contain a minimum of 5% tin.

To the accomplishment of the foregoing and related ends, the invention, then, consists of the method hereinafter fully described and pointed out in the claims; the annexed drawing and following description setting forth in detail certain means and one mode of carrying out the invention, such disclosed means and mode illustrating, however, but one of various ways in which the principle of the invention may be used.

In said annexed drawing, the single figure is a circumferential cross-section of a semi-cylindrical bearing.

We have found that if in the bearing already described a barrier layer of metal is interposed between the layer heretofore referred to as the intermediate layer, which is silver, copper or an alloy of one or the other, and the overlay, diffusion of the tin from the overlay bearing material into the intermediate layer can be controlled. This result can be secured by interposing a thin barrier "flash" layer or film of nickel, cobalt or iron of approximately .00005 to .0001 inch. Referring now to the drawing, our improved bearing consists of a steel backing member 1, an intermediate layer of substantial thickness 2, a diffusion controlling layer, of the order of thickness referred to above, 3 and a surface bearing layer 4. In such a bearing the intermediate layer 2 may have an approximate composition of 75% copper, 24% lead, and .5% tin, which is bonded thereto all over the inner surface of the steel and an electroplated surface layer 4 of approximately .001 inch of a metal having an approximate composition of 85% lead, 12% tin and 3% copper.

In order to control the diffusion of the tin from the surface layer, the diffusion preventing barrier layer 3, which may be nickel, which is electroplated onto the inner surface of the intermediate layer 2, of a thickness not less than .00005 inch, and in some cases may be from .00005 to .0001 of an inch, or more if desirable. In this construction it is usually desirable to include also, a silver strike between the intermediate layer and the diffusion barrier layer to improve the bond between the layers. It is not believed that this silver strike contributes to the prevention of diffusion but it does add to the strength of the completed bearing.

In such a bearing, diffusion of the tin into the intermediate layer is controlled so that it will not fall below 5% in the overlay and it has also been found that even when the layer 4 of overlay has been worn off by operation that the shaft operates satisfactorily directly against the intermediate diffusion controlling layer 3. In fatigue, our improved bearing has a life of several times longer than the conventional three-layer bearings described above, while in corrosion tests our improved bearing showed a superiority of many times over the present three-layer bearing in tests of continued operation in actual service in motors. Any of the metals named, that is nickel, cobalt or iron, may be used as a diffusion controlling layer and alloys of any one of this group of metals can be similarly used if their use would be practical from an economic standpoint.

In some cases it has been found practical to use an intermediate layer of pure copper and in this case a barrier layer of less than .0001 inch of nickel has been found to be sufficient to prevent diffusion of tin from the bearing layer which is superimposed on the nickel barrier layer. Similarly, pure silver may of course be used as the intermediate layer in cases where the additional cost is warranted.

In present invention the superior qualities of the three-layer bearings, heretofore described, have been preserved and increased and at the same time the very serious disadvantage occurring with the three layer bearings when operating under high temperature conditions have been avoided. In the past and with the three layer bearing, at high engine temperatures after a certain period of time, the tin diminished in the surface layer by diffusion into the intermediate layer leaving the surface layer too rich in lead and too susceptible to corrosion by the oil which is used as a lubricant. A further disadvantage of this diffusion is that the diffused tin particles from undesirable intermetallic compounds of copper-tin on the surface of the intermediate layer. These intermetallics are extremely hard and brittle and have undesirable bearing surface properties in the event that the surface layer is removed by wearing, wiping or corroding and in that event seriously effect and, in fact, destroy the valuable properties of the part as a bearing.

Other means of employing the principle of the invention may be employed instead of the means explained, change being made as regards to the structure herein disclosed, provided the means stated by the following claims or the equivalent of such stated means be employed.

We, therefore, particularly point out and claim as our invention:

1. A composite bearing consisting of a steel backing layer, an intermediate layer of a high conductivity metal, a relatively thin barrier layer of a metal resistant to tin diffusion and a surface layer of a tin containing bearing alloy metal, said layers being uniformly bonded to each other all over their engaging surfaces.

2. A composite bearing consisting of a backing layer, an intermediate layer of a high conductivity metal having a medium modulus of elasticity, a relatively thin barrier layer of a metal resistant to tin diffusion and a surface layer of a tin containing bearing alloy metal, said layers being uniformly bonded to each other all over their engaging surfaces.

3. A composite bearing consisting of a steel backing layer, an intermediate layer of copper-lead, a barrier layer of a metal of the iron group and of the thickness of approximately .0001 inch, and a surface layer of a tin containing bearing alloy metal, said layers being uniformly bonded to each other all over their engaging surfaces.

4. A composite bearing consisting of a steel backing layer, an intermediate layer of copper-lead, a barrier layer of nickel having a thickness approximating .0001 inch, and a surface layer of a tin containing bearing alloy metal having a thickness of less than .005 inch, said layers being uniformly bonded together all over their engaging surfaces.

5. A composite bearing consisting of a steel backing layer, an intermediate layer of copper, a barrier layer of approximately .0001 inch of nickel, and a surface layer of a tin containing bearing alloy metal having a thickness of less than .005 inch, said layers being uniformly bonded together over their engaging surfaces.

6. A composite bearing consisting of a steel shell, an intermediate layer of a high conductivity metal, a relatively thin barrier layer of a metal of the iron group resistant to tin diffusion and a surface layer of a tin-containing alloy bearing metal, said layers being uniformly bonded to each other all over their engaging surfaces.

7. A composite bearing consisting of a steel shell, an intermediate layer of a high conductivity metal, an electroplated deposit of a barrier layer of a flash thickness, said metal being resistant to tin diffusion, and a surface layer of a tin containing alloy bearing metal, said layers being uniformly bonded to each other all over their engaging surfaces.

8. A composite bearing consisting of a steel backing layer, an intermediate layer of silver, a barrier layer of approximately .0001 inch of nickel, and a surface layer of a tin containing bearing alloy metal having a thickness of less than .005 inch, said layers being uniformly bonded together over their engaging surfaces.

9. A composite bearing consisting of a steel backing layer, an intermediate layer of a copper base alloy of approximately 75% copper, 24% lead, and .5% tin; a flash layer of silver; a barrier layer of approximately .0001 inch of nickel, and a surface layer of approximately 85% lead, 12% tin and 3% copper.

HENRY W. LUETKEMEYER.
RALPH A. SCHAEFER.

No references cited.